United States Patent [19]

Yoshimoto et al.

[11] Patent Number: 5,093,724
[45] Date of Patent: Mar. 3, 1992

[54] SEMICONDUCTOR DEVICE CONTAINING VIDEO SIGNAL PROCESSING CIRCUIT

[75] Inventors: Masahiko Yoshimoto; Hiroshi Segawa; Tetsuya Matsumura, all of Hyogo, Japan

[73] Assignee: Mitsubishi Denki Kabushiki Kaisha, Tokyo, Japan

[21] Appl. No.: 494,073

[22] Filed: Mar. 15, 1990

Related U.S. Application Data

[63] Continuation of Ser. No. 94,648, Sep. 9, 1987, Pat. No. 4,924,314.

[30] Foreign Application Priority Data

Sep. 9, 1986 [JP] Japan .................. 61-213112

[51] Int. Cl.⁵ .................................. H04N 5/14
[52] U.S. Cl. ........................... 358/160; 358/159
[58] Field of Search .......... 358/160, 139, 10, 31; 324/85 D

[56] References Cited

U.S. PATENT DOCUMENTS 3,716,667  2/1973  Connor et al. .
4,050,084  9/1977  Rossi .
4,558,447  12/1985  Freeman et al. .
4,698,673  10/1987  Johnson .
4,811,094  3/1989  Sakata .

FOREIGN PATENT DOCUMENTS 0117295  11/1983  European Pat. Off. .
0179594  10/1985  European Pat. Off. .
1288123  1/1966  Fed. Rep. of Germany .
2250796  10/1972  Fed. Rep. of Germany .
2216646  2/1973  France .
7606659  6/1976  Netherlands .

OTHER PUBLICATIONS

William K. Hickok, "Amplitude and Phase Sensitive Comb Filter", Research Disclosure, 9/78, No. 17356.

Primary Examiner—James J. Groody
Assistant Examiner—David E. Harvey
Attorney, Agent, or Firm—Lowe, Price, LeBlanc & Becker

[57] ABSTRACT

An integrated circuit 1 for video signal processing comprises a 2-line memory 3, a video signal processing circuit 4 and a coincidence circuit 6. A digital video signal of 8 bits inputted to an input terminal group 2 is applied to the 2-line memory 3 and the coincidence circuit 6. Also, the 2-line delay signal of 8 bits outputted from the 2-line memory 3 is applied to the coincidence circuit 6. The coincidence circuit 6 determines coincidence or non-coincidence of the input digital video signal and the 2-line delay signal received and outputs the result of that determination through a coincidence output terminal. As a result, an operation of the 2-line memory 3 can be tested individually.

15 Claims, 4 Drawing Sheets

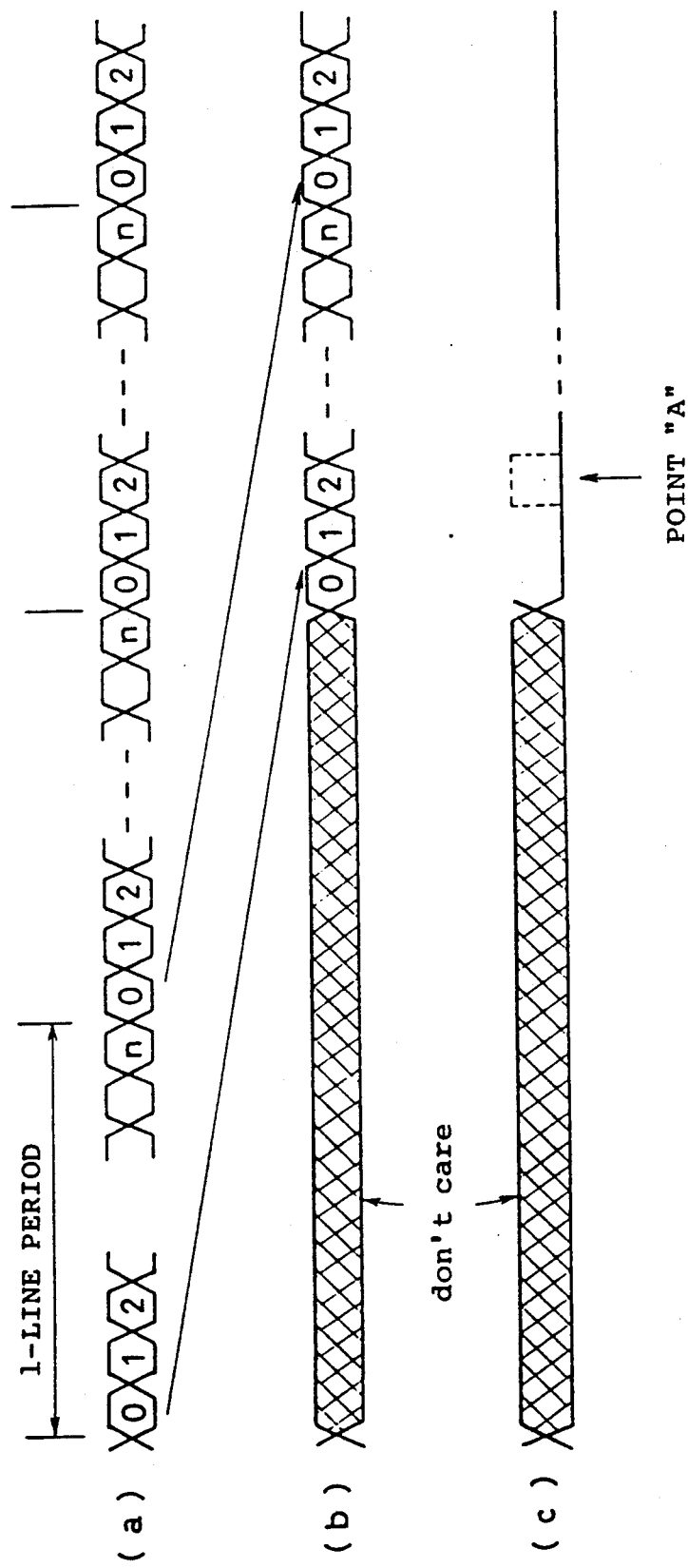

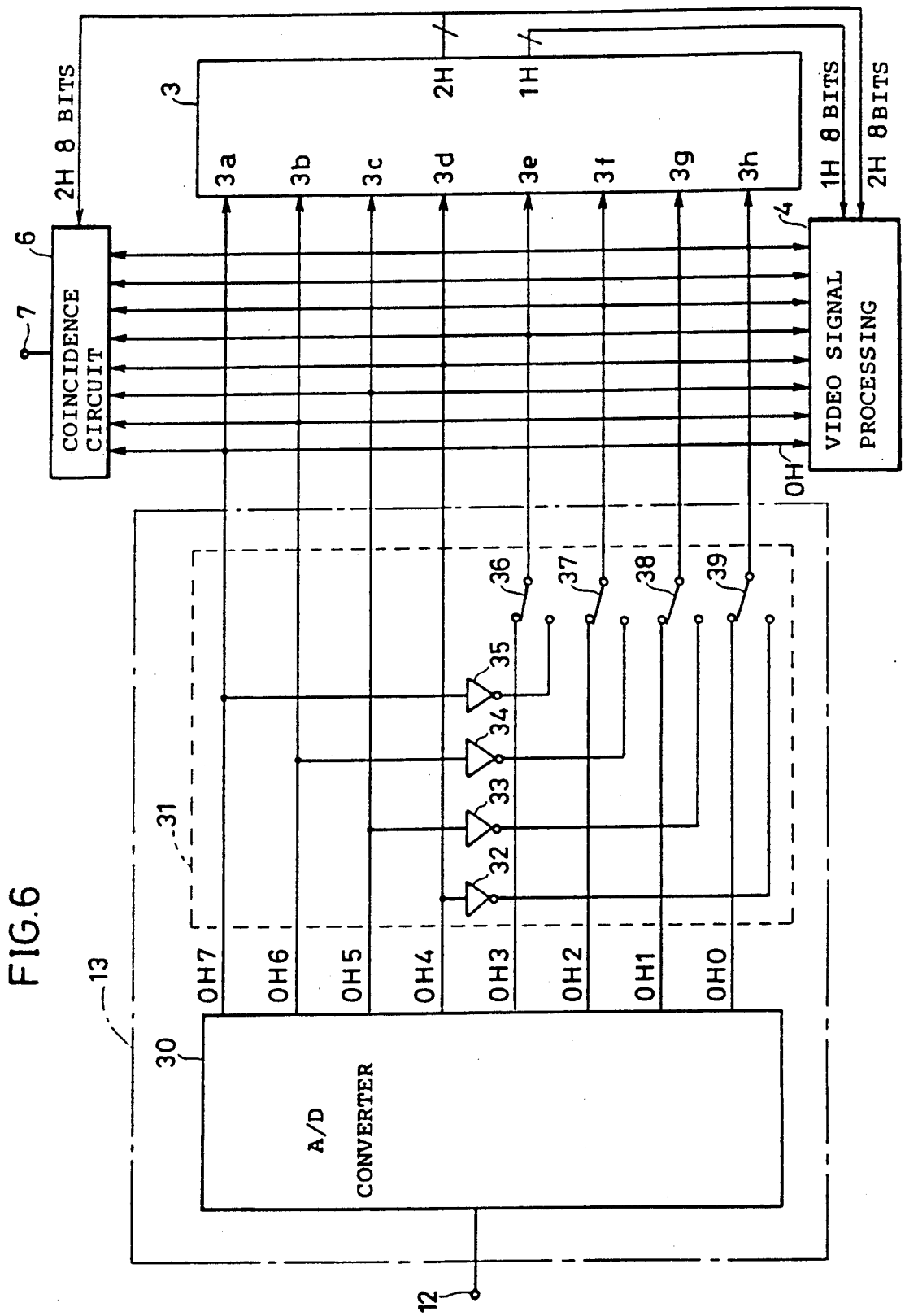

SEMICONDUCTOR DEVICE CONTAINING VIDEO SIGNAL PROCESSING CIRCUIT

This application is a continuation of application Ser. No. 07/094,648, filed Sept. 9, 1987, now U.S. Pat. No. 4,924,314.

BACKGROUND OF THE INVENTION

1. Field of the Invention

The present invention relates to a semiconductor device and, more particularly, to a semiconductor device containing therein a video signal processing circuit for performing video signal processing in response to a delayed digital video signal.

2. Description of the Prior Art

FIG. 1 shows a schematic block diagram showing one example of a conventional semiconductor device containing therein a video signal processing circuit. Referring to FIG. 1, an integrated circuit 1 for video signal processing comprises a 2-line memory 3 and a video signal processing circuit 4. A 8-bit digital video signal is inputted to an input terminal group 2 and the 8-bit digital video signal is applied to the input of the 2-line memory 3 and also applied to the input of the video signal processing circuit 4. The 2-line memory 3 delays the 8-bit digital video signal applied by 1 line (1H) and 2 lines (2H) and applies the respective delay output to the video signal processing circuit 4 as a 8-bit digital signal. The video signal processing circuit 4 performs predetermined video signal processing in response to the 8-bit digital video signal (0H) received directly from the input terminal group 2 and two 8-bit delay digital video signals (1H) and (2H) received from the 2-line memory 3.

However, since the conventional semiconductor device for video signal processing is thus structured and the digital delay outputs of the 2-line memory 3 are directly applied to the video signal processing circuit 4 without being taken out, only that 2-line memory 3 can not be tested individually, which is a problem.

SUMMARY OF THE INVENTION

Therefore, a main object of the present invention is to provide a semiconductor device for delaying a digital video signal and processing the delayed signal in which only digital delay means can be tested easily and separately.

Briefly, the present invention comprises means for providing an n-bit (n is a positive integer) digital video signal, digital delay means responsive to the n-bit digital video signal from the digital video signal providing means for outputting a 1-line through m-line (m is a positive integer) delay signal of the n-bit digital video signal, video signal processing means responsive to the digital delay means output for performing video signal processing, and coincidence determining means for comparing the n-bit digital video signal inputted from the digital video signal providing means to the digital delay means with an l-line (l is an integer, $1 \leq l \leq m$) delay signal to be tested, out of 1-line through m-line delay signals outputted from the digital delay means and determining coincidence of the n-bit digital video signal and the l-line delay signal.

In accordance with another aspect of the present invention, the above mentioned digital video signal providing means comprises analog-digital converting means for converting an analog video signal externally applied to the n-bit digital video signal.

In accordance with still another aspect of the present invention, the above mentioned analog-digital converting means comprises switching means for replacing a specific less significant bit, out of the converted n-bit digital video signal with a specific more significant bit out of the converted n-bits at the test of the digital delay means.

The major advantage of the present invention is that it can be easily tested whether said digital delay means is good or no good in response to the coincidence determined output because coincidence of the digital input signal inputted to the digital delay means and the digital output signal delayed by the digital delay means is to be determined.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart for explaining an operation of a first embodiment of the present invention shown in FIGS. 1 and 2.

FIG. 6 is a schematic block diagram showing a third embodiment of the present invention.

DESCRIPTION OF THE PREFERRED EMBODIMENTS

Figure 2:
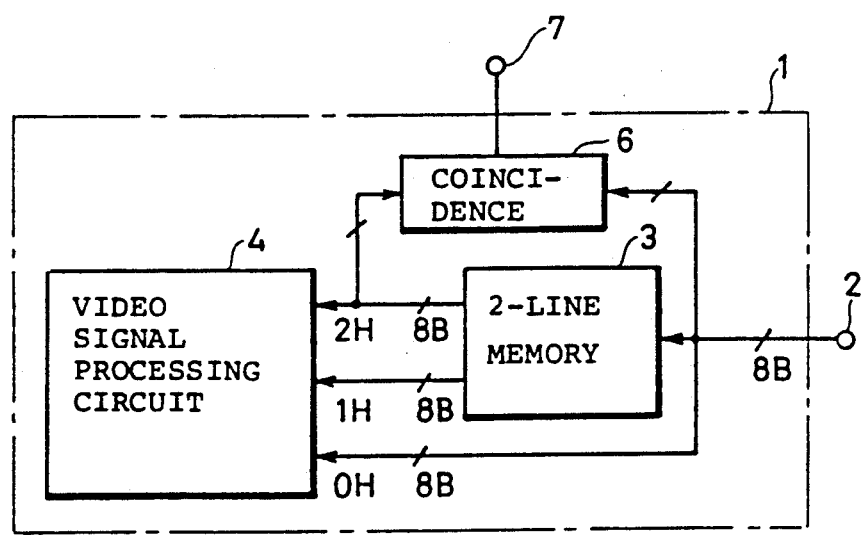
FIG. 2 is a schematic block diagram showing a first embodiment of the present invention.

FIG. 2 is a schematic block diagram showing a first embodiment of a semiconductor device of the present invention.

Figure 1:
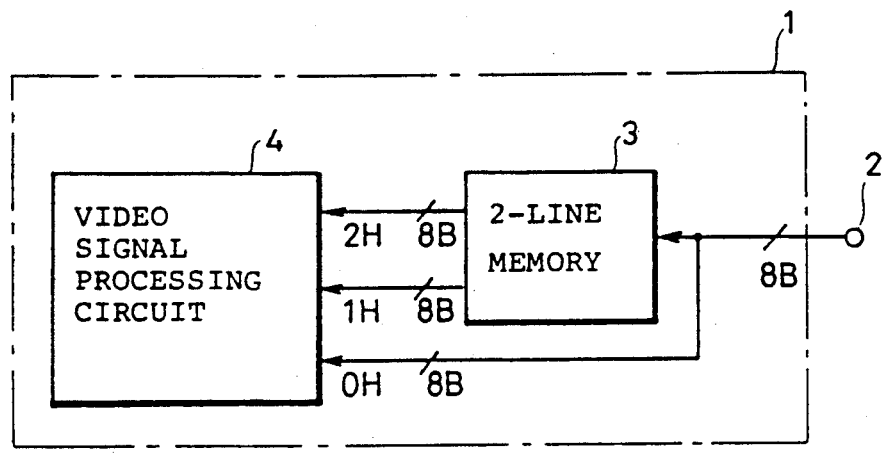
FIG. 1 is a schematic block diagram showing one example of a conventional semiconductor device.

A structure of a semiconductor device of the first embodiment of the present invention shown in FIG. 2 is the same as that of a conventional semiconductor device shown in FIG. 1 except for the following. That is, there are provided a coincidence circuit 6 for receiving the 8-bit digital video signal inputted from the input terminal group 2 and the 2-line delay (2H) signal of 8 bits outputted from the 2-line memory 3 and determining coincidence or non-coincidence of both and a coincidence output terminal 7 for outputting the result of the determination, and the integrated circuit 1 for video signal processing comprises the 2-line memory 3, the video signal processing circuit 4 and the coincidence circuit 6.

Figure 3:
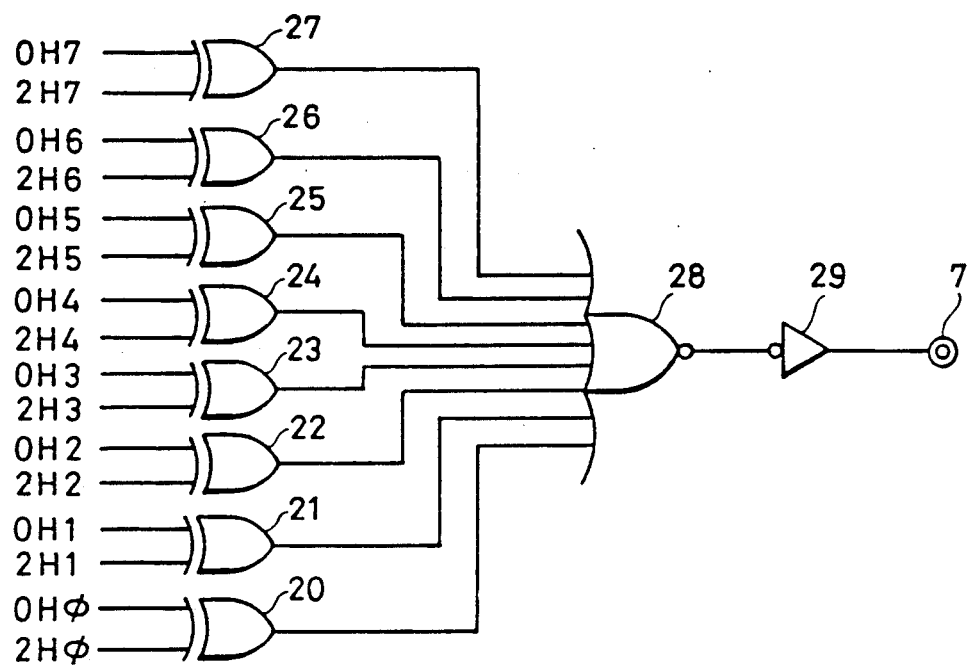
FIG. 3 is a block diagram showing a coincidence circuit in detail shown in FIG. 2.

FIG. 3 is a block diagram showing the coincidence circuit 6 in FIG. 2 more specifically.

A structure of the coincidence circuit 6 shown in FIG. 3 is now described. Referring to FIG. 3, the coincidence circuit 6 comprises 2-input EXOR gates 20–27, 8-input NOR gate 28 and an inverter 29. The input digital video signal of 8 bits (OH7-0H0 in turn from MSB) inputted from the input terminal group 2 to the 2-line memory 3 is inputted to respective one input terminal of the EXOR gates 20–27 and the 2-line delay signal of 8 bits (2H7-2H0 in turn from MSB) outputted from the 2-line memory 3 is inputted to respective other input terminal of the EXOR gates 20-27. The outputs of the EXOR gates 20-27 are applied to the inputs of the NOR gate 28 and the output of the NOR gate 28 is outputted from the coincidence output terminal 7 after it is converted by the inverter 29.

Next, FIG. 4 is a timing chart for explaining an operation of a semiconductor device of a first embodiment of the present invention shown in FIGS. 2 and 3. FIG. 4(a) shows the input digital video signal from the input terminal group 2 to the coincidence circuit 6, FIG. 4(b) shows the 2-line delay (2H) signal from the 2-line memory 3 and FIG. 4(c) shows the output of the coincidence circuit 6.

Next, referring to FIGS. 2-4, an operation of the first embodiment of the present invention is now described.

First, a digital video signal of the same contents shown in FIG. 4(a) is inputted repeatedly to an input terminal group 2 at every 1-line period and inputted to the 2-line memory 3 and the coincidence circuit 6. After 2-line period has passed since the input started, the 2-line delay (2H) signal coinciding completely with the input digital video signal to the coincidence circuit 6 is outputted from the 2-line memory 3 and inputted to the video signal processing circuit 4 and the coincidence circuit 6 as shown in FIG. 4(b) if the 2-line memory 3 is normal. In this way, if the input digital video signal to the coincidence circuit 6 and the 2-line delay (2H) signal coincide with each other, all of the outputs of EXOR gates 20-27 constituting the coincidence circuit 6 become "L" level and the signal of "L" level is outputted to the coincidence output terminal 7.

Conversely, if there is even one bit of non-coincidence between the input digital video signal and the 2-line delay (2H) signal, for example, if 0H3 and 2H3 do not coincide with each other, the output of EXOR gate 23 becomes "H" level, with the result that the signal of "H" level appears on the coincidence output terminal 7 (point A in FIG. 3). Therefore, it can be easily tested whether the 2-line memory 3 operates normally or not, by detecting the signal outputted from the coincidence circuit 6 through the coincidence output terminal 7.

Figure 5:
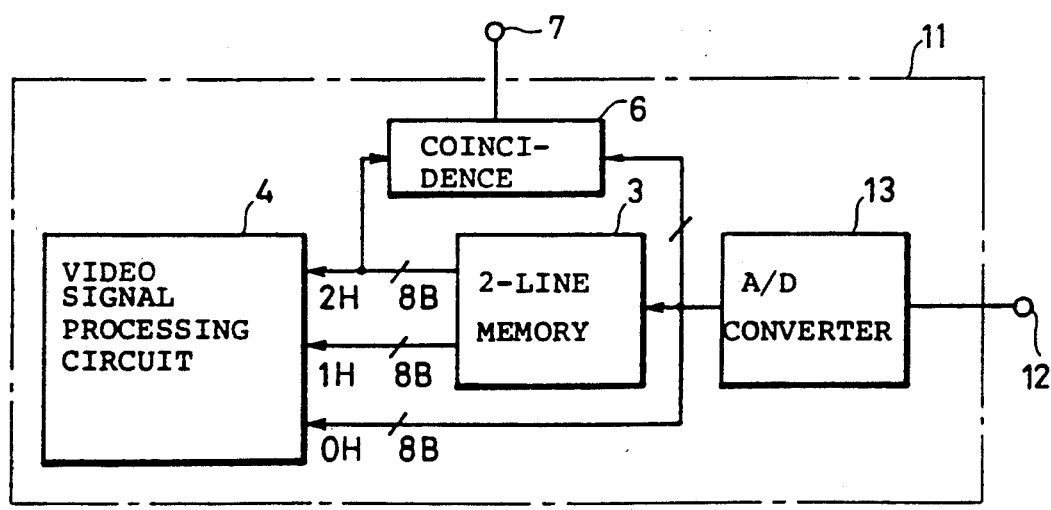
FIG. 5 is a schematic block diagram showing a second embodiment of the present invention.

Next, FIG. 5 is a schematic block diagram showing a second embodiment of the present invention. In the embodiment shown in FIG. 5, the present invention is applied to an integrated circuit 11 for video signal processing containing a A/D converter 13 therein. An analog video signal is inputted from an input terminal 12 to the A/D converter 13. The inputted analog video signal is converted to a digital signal by the A/D converter 13. The digital signal is delayed by the 2-line memory 3 and applied also to the coincidence circuit 6. The coincidence circuit 6 tests whether the 2-line memory 3 is operating normally or not by determining coincidence and non-coincidence of a digitized video signal and the digital video signal delayed by 2 lines by the 2-line memory 3.

Meanwhile, repeatability of a signal could be lost at every line period with regard to a less significant bit or bits of a digital video signal output of the A/D converter 13, due to a quantization error and non-linear error of the A/D converter 13 and also due to a noise superimposed on the analog video signal inputted to the A/D converter 13. In such case, even if the 2-line memory 3 functions normally, non-coincidence will be caused between both digital video signals compared in the coincidence circuit 6 at intervals of 2-line period, so that the coincidence circuit 6 can not achieve its inherent purpose such as a function test of the 2-line memory 3. FIG. 6 is a schematic block diagram showing a third embodiment of the present invention comprising an A/D converter including effective switching means when repeatability of a digital video signal is lost as mentioned above.

A structure of an embodiment shown in FIG. 6 is the same as that of an embodiment shown in FIG. 5 except for the following. That is, the A/D converter 13 comprises an A/D converting circuit 30 and an input signal switching circuit 31, wherein assuming that input terminals of the 2-line memory 3 are 3a, 3b..., 3H, in order, from MSB, more significant bit values 0H7, 0H6, 0H5, 0H4 of the 8-bit digital video signal outputs of the A/D converting circuit 30 are applied intact to the corresponding input terminals 3a, 3b, 3c and 3d of the 2-line memory 3 through the input signal switching circuit 31. In addition, the input signal switching circuit 31 includes inverters 32, 33, 34 and 35 which generate inverted signals $\overline{0H7}$, $\overline{0H6}$, $\overline{0H5}$, $\overline{0H4}$ of the above-mentioned more significant bit values 0H7, 0H6, 0H5 and 0H4, respectively. In addition, the input signal switching circuit 31 further includes switching means 36, 37, 38 and 39 and these switching means switch to apply less significant bit values 0H3, 0H2, 0H1 and 0H0 of digital video signal outputs of the A/D converting circuit 30 intact to the corresponding input terminals 3e, 3f, 3g and 3h of the 2-line memory 3 when using said semiconductor device for video processing of an inherent aim. On the other hand, when a function test of the 2-line memory 3 is performed using the coincidence circuit 6, these switching means switch to apply inverted signals $\overline{0H7}$, $\overline{0H6}$, $\overline{0H5}$ and $\overline{0H4}$ generated at inverters 32, 33, 34 and 35 to the corresponding input terminals 3e, 3f, 3g and 3h of the 2-line memory 3.

More specifically, at the time of testing a function of the 2-line memory 3, more accurate function test of the 2-line memory 3 can be performed by disconnecting a connection of less significant bit outputs of the A/D converting circuit 30, susceptible to influence of noise, and the like, to the 2-line memory 3 and the coincidence circuit 6, and alternatively applying logically-inverted data of more significant bit of a 8-bit digital output of the A/D converting circuit 30, which is assured of repeatability of every line period, to less significant bit input terminals 3e, 3f, 3g and 3h of the 2-line memory 3.

Incidentally, logically-inverted data of more significant bit of digital outputs of the A/D converting circuit 30 is used for improving defect detecting ratio of a function test and more significant bit of digital outputs of the A/D converting circuit 30 may be applied intact to input terminals of less significant bit 3e, 3f, 3g and 3h of the 2-line memory 3 without providing inverters 32, 33, 34 and 35.

Also, switching of an input signal by switching means is not limited to less significant 4 bits of 8-bit digital signal outputs of the A/D converting circuit 30, so that it may be structured to perform switching of an input signal for less significant bits poor especially in repeatability of every line period, for example, less significant 2 bits.

In addition, although the 2-line memory 3 was used as digital delay means in the above-mentioned embodiment, it is not limited to this and the other circuit means such as a shift register may be used.

Also, the number of lines to be delayed is not limited to two lines, and the number of lines may be any number.

In addition, although coincidence of a last line delay output and an input video signal is determined in the above-mentioned embodiment, coincidence of a delay output and an input signal of any line may be determined. For example, a plurality of pairs of coincidence determination may be provided. In this case, although coincidence circuit as many as the number of pairs are necessary, identification of a portion generating an error can be performed more accurately. Also, a video signal may be of any bit as a video signal without limiting to 8 bits.

Meanwhile, the coincidence circuit 6 in the above-mentioned embodiment is not limited to a structure shown in FIG. 3, and it may have any structure as far as the circuit functions to output a non-coincidence signal to the coincidence output terminal 7 when there is even one bit of non-coincidence between both signals compared.

Furthermore, a logic circuit may be provided between the input terminal group 2 and the 2-line memory 3. In such a case, it does not matter whether such logic circuit includes a video signal processing function or not. More specifically, when a video signal is inputted repeatedly to an input terminal group 2 at every 1-line period, the output signal is provided repeatedly from the logic circuit at every 1-line period as well and is applied to the 2-line memory 3. Accordingly, accurate test of the 2-line memory 3 can be performed in the same manner as FIG. 2 by monitoring the output of the coincidence circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A self-testing semiconductor device for processing video signals comprising:
    means for providing a digital video signal of n bits (n is a positive integer);
    digital delay means responsive to said digital video signal of n bits provided from said digital video signal providing means for supplying a 1-line through m-line (m is a positive integer) delay signal of said digital video signal of n bits;
    video signal processing means responsive to said digital delay means output for performing video signal processing; and
    means for testing an operation of said digital delay means, including coincidence determining means for (a) comparing said digital video signal of n bits inputted from said digital video signal providing means to said digital delay means and an l-line (l is an integer, $1 \leq l \leq m$) delay signal to be tested, out of said 1-line through m-line delay signal supplied from said digital delay means, (b) determining coincidence of said digital video signal of n bits and said l-line delay signal, and (c) supplying to an output terminal a result of said coincidence determination.

2. A semiconductor device in accordance with claim 1, wherein said digital video signal providing means comprises input means (2) receiving said digital video signal of n bits externally applied.

3. A semiconductor device in accordance with claim 1, wherein said digital video signal providing means comprises analog-digital converting means (13) for converting the analog video signal externally applied to said digital video signal of n bits.

4. A self-testing semiconductor device for processing video signals, comprising:
    a digital delay circuit receiving a digital video signal of n bits, where n is a positive integer, and in response, supplying a 1-line through m-line, where m is a positive integer, delay signal of the digital video signal;
    a video signal processor responsive to the output of the digital delay circuit for performing video signal processing;
    a testing circuit for testing an operation of the digital delay circuit, including a comparator for comparing the digital video signal applied to the digital delay circuit with an l-line, where l is an integer, $1 \leq l \leq m$, delay signal to be tested, out of the 1-line through m-line delay signal supplied from the digital delay circuit, wherein the operation of the digital delay circuit under test is based upon coincidence of the digital signal and the l-line delay signal and, in response, providing a test output signal; and
    an output terminal for carrying said test output signal.

5. In a self-testing semiconductor device for processing video signals comprising digital delay means responsive to an input digital video signal of n bits (n is a positive integer) for supplying a 1-line through m-line (m is a positive integer) delay signal of the input digital video signal; and video signal processing means responsive to the digital delay means output for performing video processing, a method of testing an operation of the digital delay means, comprising the steps of:
    comparing the input digital video signal with an l-line delay signal to be tested (l is an integer, $1 \leq l \leq m$) out of said 1-line through m-line delay signal supplied from said delay signal means;
    determining coincidence of said input digital video signal and said l-line delay signal; and in response supplying a test output signal to an output terminal.

6. A self-testing semiconductor device for processing video signals comprising:
    means for providing a digital video signal of n bits (n is a positive integer);
    digital delay means responsive to said digital video signal of n bits provided from said digital video signal providing means for outputting a 1-line through m-line (m is a positive integer) delay signal of said digital video signal of n bits;
    video signal processing means responsive to said digital delay means output for performing video signal processing; and
    means for testing an operating function of said digital delay means by detecting coincidence between bits of said input digital video signal and corresponding bits of said delayed digital video signal, and in response, supplying to an output terminal a function test result signal indicating whether said digital delay means is operating normally.

7. The device of claim 6, wherein said means for testing an operation of said digital delay means includes coincidence detecting means for
    (a) comparing (i) said digital video signal of n bits inputted from said digital video signal providing means to said digital delay means and (ii) an l-line (l is an integer, $1 \leq l \geq m$) delay signal to be tested, out of said 1-line through m-line delay signal outputted from said digital delay means, (b) determining coincidence of said digital video signal of n bits and said l-line delay signal, and (c) supplying a result of said coincidence determination as said function test result signal.

8. A self-testing semiconductor device for processing video signals comprising:

means for providing a digital video signal of n bits (n is an integer greater than 1);

digital delay means responsive to said digital video signal of n bits provided from said digital video signal providing means for outputting a 1-line through m-line (m is a positive integer) delay signal of said digital video signal of n bits;

video signal processing means responsive to said digital delay means output for performing video signal processing; and means for testing an operation of said digital delay means to determine whether said digital delay means is operating normally be detecting bit parallel coincidence between bits of said input digital video signal and corresponding bits of said delayed digital video signal, and in response, supplying a test result signal.

9. The device of claim 8 wherein and said means for testing an operation of said digital delay means includes coincidence detecting means for (a) comparing, in parallel, (i) said n bits of said digital video signal inputted from said digital video signal providing means to said digital delay means and (ii) n bits of an l-line (l is an integer, $1 \leq l \geq m$) delay signal to be tested out of said 1-line through m-line delay signal outputted from said digital delay means, (b) determining coincidence of said digital video signal of n bits and said l-line delay signal, and (c) supplying a result of said coincidence determination as said function test result signal.

10. A self-testing semiconductor device for processing video signals, comprising:

an input node receiving a digital video signal and a test digital video signal;

digital delay means connected between said input node and an output node; and means for testing an operation of said digital delay means by detecting bit parallel coincidence between (i) bits of said test digital video signal appearing at said input node and (ii) bits of said test digital video signal delayed by said digital delay means, and outputting a result of testing at a test signal output node.

11. In a self-testing semiconductor device for processing video signals comprising digital delay means responsive to an input digital video signals of n bits (n is a positive integer), and video processing means responsive to an output of the digital delay means for performing video processing, a method of testing an operation of the digital delay means, comprising the steps of:

delaying said input digital video signal to output a 1-line through m-line (m is a positive integer) delay signal of said input digital video signal of n bits;

detecting coincidence between bits of said input digital video signal and corresponding bits of said delayed digital video signal; and in response supplying to an output terminal a function test result signal indicating whether said digital delay means is operating normally.

12. The method of claim 11, wherein said detecting coincidence detecting step comprises the steps of:

(a) comparing said input digital video signal of n bits and an l-line (l is an integer, $1 \leq l \geq m$) delay signal to be tested out of said 1-line through m-line delay signal, (b) determining coincidence of said digital video signal of n bits and said l-line delay signal, and (c) supplying a result of said coincidence determination as said function test result signal.

13. In a self-testing semiconductor device for processing video signals comprising digital delay means responsive to an input digital video signal of n bits (n is an integer greater than 1), and video processing means responsive to an output of the digital delay means output for performing video processing, a method of testing an operation of the digital delay means, comprising the steps of:

delaying said input digital video signal of n bits for outputting a 1-line through m-line (m is a positive integer) delay signal of said digital video signal of n bits; and testing an operation of said digital delay means, to determine whether said digital delay means is operating normally, by detecting bit parallel coincidence between bits of said input digital video signal and corresponding bits of said delayed digital video signal, and in response, supplying a test result signal.

14. The method of claim 13, wherein and said testing step includes the steps of:

(a) comparing, in parallel, (i) said n bits of said input digital video signal and (ii) n bits of an l-line (l is an integer, $1 \leq l \geq m$) delay signal to be tested out of said 1-line through m-line delay signal, (b) determining coincidence of said digital video signal of n bits and said l-line delay signal, and (c) supplying a result of said coincidence determination as said function test result signal.

15. A method of self-testing a video processing semiconductor device, comprising the steps of:

receiving a digital video signal and a digital video signal for testing;

delaying said test digital video signal for supplying a delayed test digital signal;

testing an operation of said digital delay means by detecting bit parallel coincidence between (i) bits of said test digital video signal prior to said delay step and (ii) bits of said delayed test digital video signal; and outputting a result of testing at a test signal output node.

* * * * *